(12) United States Patent
Laquay et al.

(10) Patent No.: US 6,488,449 B1
(45) Date of Patent: Dec. 3, 2002

(54) CONVEYOR FOR TRANSPORTING ARTICLES HAVING A COLLAR AND INCLUDING A FITTED STOP TO REDUCE THE RISK OF THE ARTICLES JAMMING

(75) Inventors: Fabien Laquay, Hem (FR); Jean-Luc Meunier, Lens (FR); Gilles Blanchet, Armentieres (FR); Bruno Travail, Villeneuve D'Ascq (FR); Joel Trenel, Marcq en Baroeul (FR); Philippe Declercq, Ploegsteert (BE)

(73) Assignee: Netra Systems, Marcq en Baroeul (FR)

( * ) Notice: Subject to any disclaimer, the term of this patent is extended or adjusted under 35 U.S.C. 154(b) by 0 days.

(21) Appl. No.: 09/486,352

(22) PCT Filed: Jul. 24, 1998

(86) PCT No.: PCT/FR98/01646

§ 371 (c)(1),
(2), (4) Date: Feb. 25, 2000

(87) PCT Pub. No.: WO99/10263

PCT Pub. Date: Mar. 4, 1999

(30) Foreign Application Priority Data

Aug. 25, 1997 (FR) .......................................... 97 107700

(51) Int. Cl.[7] .............................................. B65G 51/02
(52) U.S. Cl. .................. 406/88; 198/466.1; 198/465.4; 406/87
(58) Field of Search .......................... 198/466.1, 465.4, 198/493; 406/87, 88, 191, 76

(56) References Cited

U.S. PATENT DOCUMENTS

| | | | | | |
|---|---|---|---|---|---|
| 4,822,214 A | * | 4/1989 | Aidlin et al. | ................. | 406/86 |
| 5,028,174 A | * | 7/1991 | Karass | ................. | 406/88 |
| 5,161,919 A | * | 11/1992 | Smith et al. | ................. | 406/86 |
| 5,246,314 A | * | 9/1993 | Smith et al. | ................. | 406/86 |
| 5,248,045 A | * | 9/1993 | Alvelda | ................. | 209/522 |
| 5,421,678 A | * | 6/1995 | Aidlin et al. | ................. | 406/88 |
| 5,437,521 A | * | 8/1995 | Ouellette | ................. | 406/88 |
| 5,484,237 A | * | 1/1996 | Langenbeck | ................. | 406/86 |
| 5,501,552 A | * | 3/1996 | Simkowski | ................. | 406/52 |
| 5,516,239 A | * | 5/1996 | Warren et al. | ................. | 406/88 |
| 5,542,789 A | * | 8/1996 | Aidlin et al. | ................. | 406/88 |
| 5,553,080 A | * | 9/1996 | Patois et al. | ................. | 198/626.1 |
| 5,553,698 A | * | 9/1996 | Patois et al. | ................. | 198/626.1 |
| 5,567,091 A | * | 10/1996 | Johnson et al. | ................. | 406/182 |
| 5,630,679 A | * | 5/1997 | Simkowski et al. | ................. | 406/86 |
| 5,695,302 A | * | 12/1997 | Hilbish | ................. | 406/88 |
| 5,785,169 A | * | 7/1998 | Egger | ................. | 198/493 |
| 5,820,306 A | * | 10/1998 | Hilbish et al. | ................. | 406/88 |
| 5,947,647 A | * | 9/1999 | Ouellette | ................. | 406/191 |
| 5,951,211 A | * | 9/1999 | Ouellete | ................. | 406/88 |
| 6,024,518 A | * | 2/2000 | Ouellette | ................. | 406/88 |
| 6,033,156 A | * | 2/2000 | Marti Sala | ................. | 406/86 |
| 6,062,773 A | * | 5/2000 | Ouellette | ................. | 406/88 |
| 6,190,094 B1 | * | 2/2001 | Rediess et al. | ................. | 406/19 |

FOREIGN PATENT DOCUMENTS

GB          2 092 981          8/1982

* cited by examiner

*Primary Examiner*—Christopher P. Ellis
*Assistant Examiner*—Rashmi Sharma
(74) *Attorney, Agent, or Firm*—Wolf, Greenfield & Sacks, P.C.

(57) ABSTRACT

The conveyor comprises two spaced-apart under-neck guides (3) along which articles are designed to be transported by being suspended via their collars (2) on the under-neck guides (3), and also a longitudinal stop (6) which is mounted above the under-neck guides (3) and which serves to limit the up stroke available to the articles between the under-neck guides (3). In a preferred embodiment, the top abutment is in the form of a stop (6) having an abutment-forming bottom longitudinal face (6a) in which there is formed a longitudinal central channel (6b) of width (L) that is less than the diameter (D) of an article at its top end (1d).

28 Claims, 4 Drawing Sheets

CONVEYOR FOR TRANSPORTING ARTICLES HAVING A COLLAR AND INCLUDING A FITTED STOP TO REDUCE THE RISK OF THE ARTICLES JAMMING

RELATED APPLICATIONS

Foreign priority benefits are claimed under 35 U.S.C. § 119(a)–(d) or 35 U.S.C. § 365(b) from French Patent Application Serial No. 97/10770 filed Aug. 25, 1997, and under 35 U.S.C. § 365(a) from PCT International Application PCT/FR98/01646 filed Jul. 24, 1998, which designated at least one country other than the United States. PCT Application PCT/FR98/01646 of which this application is a National Stage filing under 35 U.S.C. § 371, was published under PCT article 21(2) in French.

BACKGROUND OF THE INVENTION

The Present/invention relates to conveying articles having a collar or the like projecting therefrom and enabling them to be suspended while they are being transported. The invention relates more particularly to a conveyor in which the articles are transported while being suspended from their collars resting on two under-neck guides acting as guide rails, and being more particularly propelled one behind another by means of a flow of air. A main application of the invention lies in transporting lightweight articles made of plastics, such as receptacles (pots, bottles, etc.) made of PET, PVC, etc . . . , in particular during packaging operations involving these articles, the conveyor being used, for example, to bring a line of empty receptacles from an upstream machine for manufacturing the receptacles (a blow-molding machining) to a downstream machine for filling the receptacles (a bottling machine).

In the field of bottling, it is now a widespread practice to use pneumatic conveyors in which empty bottles, or more generally articles, are guided one behind another between two under-neck guides while being supported by means of respective projections from their necks (the collars). The articles are set into motion individually one behind another or else in entire trains of bottles, under drive from jets of air. Such conveyors have already been described, for example, in international patent application WO 90/10587, and in British patent application GB 2 092 981. In those two publications, the driving airjets are directed mainly on the necks of the articles above their collars. In other types of known conveyors, the driving air jets can also be directed onto the bodies of the articles below their collars.

While they are being transported, the articles which are supported solely by their collars have a tendency to swing relative to the vertical. Receptacles swinging relative to the vertical in a direction that is transverse to their travel direction become difficult to convey and also give rise to risk of the articles being dropped or else becoming jammed. Proposals have therefore already been made to limit such swinging in a direction that is transverse to the travel direction by fitting conveyors with lateral guides positioned on either side of the article transport path. In practice, such lateral guides are positioned level with the cylindrical body portions of the articles and they are spaced apart from each other by a distance that is slightly greater than the diameter of said cylindrical portions. The articles are thus supported by their collars and while they are being transported they are held essentially vertically by the guides in respective vertical planes that extend transversely to the transport direction. However, the above-mentioned guides are not sufficient to ensure that the articles are conveyed properly. In particular, such guides do not prevent the articles from jamming while they are traveling.

In practice, while the articles are being conveyed, jamming occurs most frequently while articles are being accumulated, i.e. during stages in which the articles build up into a train that is stationary or moving very slowly, with the articles coming into contact and being pressed against one another.

Such jamming of articles during an accumulation stage can have various causes. In general, while the articles are pressed against one another they exert thrust which tends to lift them vertically off the under-neck guides. Under such circumstances, it can happen that at least one of the articles, because it has been lifted vertically, becomes jammed in position by wedging between the under-neck guides. It can also happen, when articles are of a profile which contributes to enabling them to be interfitted relative to one another, that in the event of an article being lifted vertically, the articles jam relative to one another without necessarily jamming by becoming wedged between the under-neck guides. It has also been observed that the risk of jamming is higher when transporting plastic articles, and in particular PET bottles, that have come directly from a blow-molding machine. This can be explained by the fact that the thermoplastic resin constituting the walls of the plastic articles coming from a blow-molding machine is in a state such that the walls of the articles are sticky, and the mere fact of one article rubbing against another while articles are being lifted can lead to the articles sticking together. Another cause of articles jamming during an accumulation stage is associated with the fact that an article coming into contact at speed with a train of accumulated articles tends to tilt significantly relative to the travel direction by bearing against the last article in the accumulated train. If the next article arrives at this particular moment and presses against the base of the article that is tilted in the travel direction, it exerts mechanical thrust thereon tending to lift it between the under-neck guides and to jam it in the tilted position.

Proposals have already been made in U.S. Pat. No. 5,421,678, to fit an air conveyor with tope guide-shoulders (referenced 42 in FIGS. 4, 7, and 8 of that document) whose main function is to act as an abutment in the event of an article being lifted. That solution nevertheless presents the following two major drawbacks. With that solution, the problem of receptacles jamming between the under-neck guides is indeed reduced, however a new risk arises of the receptacles jamming between the guide-shoulders, in particular when receptacles are lifted during an accumulation stage. That solution is therefore not satisfactory with regard to the problem of articles jamming during an accumulation stage. The other drawback of that solution is associated with the problem of determining the optimum setting for the spacing between the guide-shoulders. By acting on the spacing between the guide-shoulders, the distance through which the articles can be lifted can be increased or reduced. In practice, the closer together the guide-shoulders, the better the prevention of vertical jamming of the articles. However, by acting on the spacing between the guide-shoulders, the forward or backward tilt angle in a vertical plane of the articles in their travel direction is also varied. In practice, the smaller the spacing between the guide-shoulders, the more narrowly the tilt angle of the articles is limited. Although it is known that an excessive tilt angle of the articles while they are being conveyed can give rise to the articles jamming forwards or backwards relative to the under-neck guides, it is nevertheless necessary for articles that are being conveyed to be capable of oscillating slightly relative to the vertical in the transport direction through some minimum tilt angle so as to obtain better conveyability of the articles. With the top guide-shoulder solution of U.S. Pat. No. 5,421,678, it is thus necessary to adjust the spacing between the guide-shoulders as a function of two constraints: providing an effective abutment against the articles being lifted; and putting a proper limit on the forward or backward tilt angle of articles while they are being conveyed. Those two constraints make it difficult to achieve an optimum setting for the spacing of the guide-shoulders.

SUMMARY OF THE INVENTION

The present invention proposes a novel solution serving to reduce the risk of articles jamming, in particular during an accumulation stage, while mitigating the two above-mentioned drawbacks inherent to implementing top guide-shoulders having an abutment function as taught in U.S. Pat. No. 5,421,678.

The conveyor of the invention is known insofar as it comprises two spaced-apart under-neck guides along which the articles are to be transported while being suspended from the under-neck guides via their collars or the like. The term "collar" is used herein to designate any projection from the articles that enables them to be suspended while they are being transported.

In a manner characteristic of the invention, the conveyor includes a longitudinal stop fitted thereto, mounted above the under-neck guides and serving to limit the up stroke available to articles between the under-neck guides.

More particularly, for articles including a tapering portion beneath the collar, with the section of the tapering portion decreasing towards the collar and passing through a "contact" section of diameter equal to the spacing between the under-neck guides, the stop of the conveyor is preferably provided at a distance from the under-neck guides such that residual clearance exists between the stop and the top end of an article when supported in the vertical position by the under-neck guides, which residual clearance is less than the "contact" height between the under-neck guides and the contact section of the article when in the vertical position. This characteristic makes it possible to avoid an article jamming by becoming wedged between the under-neck guides in the event of an article being lifted while it is in the vertical position.

In the context of the most general concept of the invention, the top abutment can be constituted merely by a stop of given thickness fixed over the under-neck guides, e.g. on the inside face of the top wall of the blow channel of the conveyor. Under such circumstances, since the height of the stop cannot be varied, its thickness is selected as a function of the articles to be transported so that the stop performs its function as a top abutment. In another simplified variant, the height of the stop can be varied so as to enable it to be adjusted in position as a function of the articles to be transported. These simplified variants of the invention nevertheless suffer from the following drawback: the distance between the bottom face of the stop and the two under-neck guides must be selected to be as small as possible in order to best limit the risk of an article jamming in the event of the article being lifted, but must be large enough to avoid impeding the articles while they are being transported, and in particular to ensure that the tops of the articles, which tend to swing back and forth while they are being transported, do not come into contact with the top abutment while they are swinging.

To mitigate that drawback, two preferred variant embodiments of the invention are proposed.

In a first preferred variant, the stop has a longitudinal bottom face that serves as an abutment and in which there is provided a longitudinal central channel of width less than the diameter of an article at its top end. This longitudinal central channel advantageously allows a portion of the top end of an article to rise above the level of the bottom face of the stop having the abutment function while said article is swinging forwards or backwards in the transport direction. With an appropriate choice for the shape for the central channel, the articles can be allowed to swing forwards or backwards to a greater or lesser extent without coming into contact with the stop. More particularly, the shape of the central recess of the stop, and in particular in terms of the height and the width of the channel, is designed in such a manner as to ensure that residual clearance exists between the stop and the top end of an article supported by the under-neck guides when the article is at a forward or backward tilt angle of 45°.

In a second preferred variant embodiment, the height of the stop relative to the under-neck guides is adjustable to occupy at least two positions:

a high position in which the articles can be transported freely without their top ends coming into contact with the stop; and a low position for limiting the up stroke available to articles between the under-neck guides, in particular while articles are accumulating.

Advantageously, the conveyor of the invention may further comprise two top longitudinal guides which are positioned on either side of the path of the articles and which serve to limit the forward or backward tilt angles of the articles in a vertical plane and in their transport direction. In the context of the invention, and contrary to the top guide-shoulders of U.S. Pat. No. 5,421,678, these top longitudinal guides do not serve to act as top abutments for engaging articles that are being lifted, but serve solely to limit forward or backward tilting of the articles. The two constraints respectively of preventing articles being lifted and of limiting the tilt angle of the articles are thus advantageously dissociated from each other.

BRIEF DESCRIPTION OF THE FIGURES

Other characteristics and advantages of the invention will appear more clearly on reading the following description of various embodiments of the conveyor of the invention, which description is given by way of non-limiting example and with reference to the accompanying drawings, in which.

DETAILED DESCRIPTION

Figure 1:
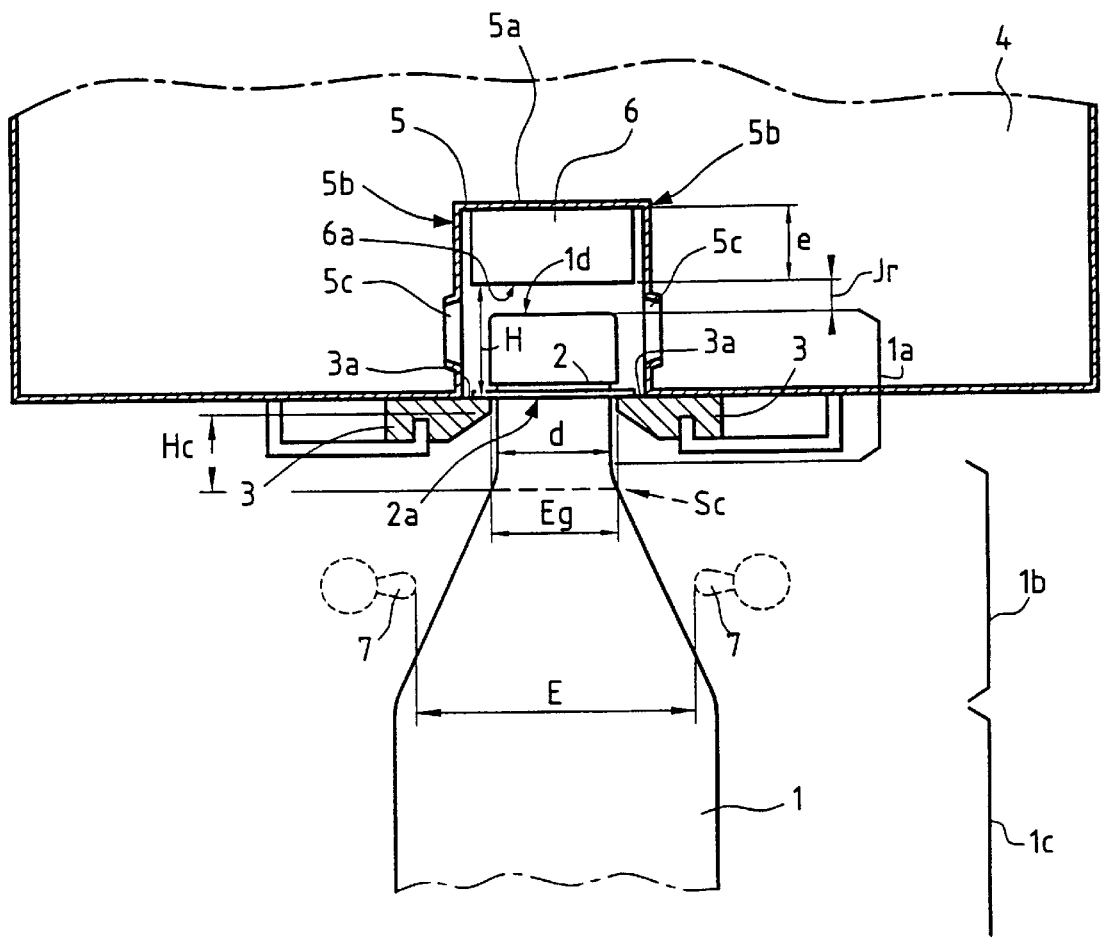
FIG. 1 is a diagrammatic cross-section of a simplified variant of an air conveyor of the invention used for transporting bottles, and implementing as its top abutment a fitted stop of constant thickness.

The conveyor shown diagrammatically in FIG. 1 is used to transport bottles 1 pneumatically in line, one behind another. Each bottle 1 has a neck 1a corresponding to the mouth of the bottle, which in the particular example shown is substantially cylindrical and of diameter d, and is provided on its neck 1a with an outwardly-projecting collar 2. Each bottle 1 also has a main body 1c of substantially cylindrical shape extended by a tapering portion 1b which leads to the neck 1a and is of section that decreases going towards the collar 2. The bottles 1 are transported by being suspended on two guide rails 3, more commonly referred to as "under-neck guides". In the particular example shown in FIG. 1, the conveyor has a wind box 4 of substantially rectangular section and fed in conventional manner with air under pressure, which air is preferably filtered. Inside the wind box 4, a blow channel 5 is provided that is of smaller size and that is in the form of a channel section defined by a top wall or web 5a and by two side walls or flanges 5b. The blow channel 5 communicates with the wind box 4 via slots 5c formed through the side walls 5b and suitably distributed over the entire length of the blow channel 5. Air under pressure inside the box 4 penetrates into the blow channel 5 and is directed against the bottles 1 above their collars 2, thereby entraining the bottles one behind another in a direction extending transversely to the plane of FIG. 1; the bottles being guided and supported during transport by the under-neck guides 3. In another variant embodiment, driving air could also be blown towards the bodies of the bottles, beneath their collars 2, e.g. by being channeled between two vertical side walls situated on either side of the bottle transport path.

In the variant of FIG. 1, the conveyor is fitted with a longitudinal stop 6 of constant thickness e. This stop 6 is fixed by any suitable conventional means to the inside face of the top wall 5a of the blow channel 5. The stop 6 extends longitudinally over the entire length of the blow channel 5. The stop 6 acts as a top abutment and serves to limit the extent to which the bottles can be lifted between the under-neck guides 3. The choice of thickness e for the stop 6 serves to determine the distance H between the bottom face 6a of the stop 6 that serves as a top abutment and the top faces 3a of the under-neck guides 3, thereby making it possible to adjust the height of the top abutment as a function of the articles to be transported. The thickness e of the stop 6 (in other words the distance H) is preferably fixed in such a manner as to leave residual clearance Jr between the bottom face 6a of the stop 6 and the top end 1d of a bottle that is supported in a vertical position by the under-neck guides 3 (FIG. 1), where the clearance Jr is less than the "contact" height Hc, i.e. the distance between the under-neck guides 3 and the "contact" section Sc of the bottle. This contact section Sc corresponds to the right section of the tapering portion 1b of the bottle whose diameter is equal to the spacing Eg between the under-neck guides 3. By means of this characteristic, in the event of a bottle 1 being lifted in the vertical position between the under-neck guides 3, it is advantageously ensured that the contact section Sc does not reach the under-neck guides 3, thereby ensuring that there is no risk of the bottle jamming in the vertical position by becoming wedged between the two under-neck guides 3. More generally, by limiting the up stroke of a bottle 1, the stop 6 serves to reduce the risk of bottles 1 jamming during an accumulation stage when the bottles rise up one on another under the effect of the compression they exert on one another, or when the bottles are lifted by tilting during a docking stage.

It will be understood that during a stage in which the bottles 1 are accumulated, the effectiveness of the stop 6 acting as a top abutment increases with decreasing residual clearance Jr (FIG. 1). In the variant of FIG. 1, this clearance Jr must nevertheless be large enough to avoid disturbing the movement of the bottles 1 while they are being transported, as can be seen more clearly in the light of FIG. 2.

Figure 2:
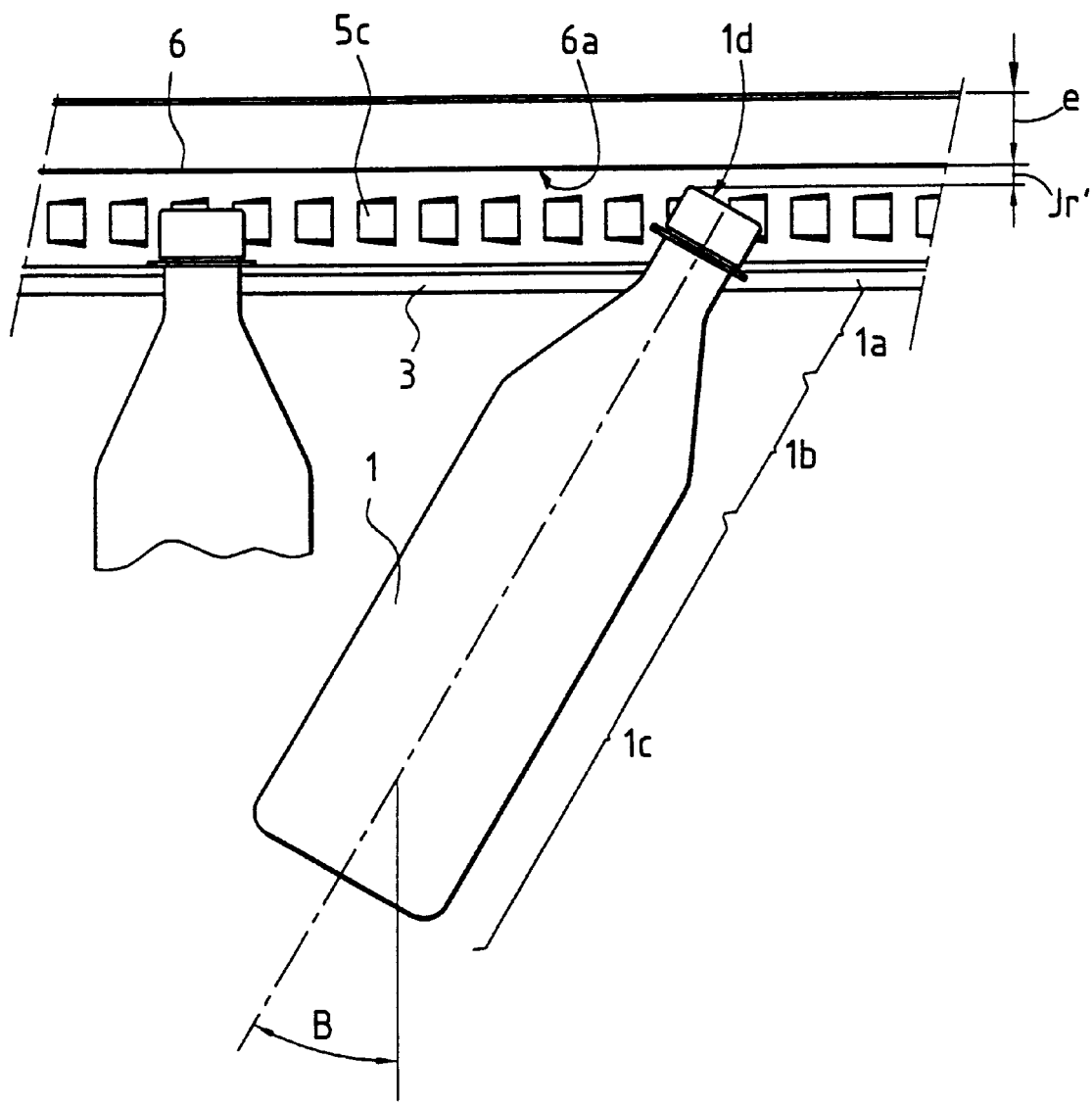
FIG. 2 is a diagram showing the residual clearance (Jr') that exists between the stop serving as a top abutment and the top end of the neck of a bottle inclined at a tilt angle (B) relative to the vertical in the transport direction.

With reference to FIG. 2, while the bottles 1 are being transported, they tend to swing forwards and backwards in the transport direction about their respective vertical equilibrium positions, swinging through a tilt angle referenced B in the figure. By way of example, the maximum value of this angle B can advantageously be adjusted by means of longitudinal guides 7 (FIG. 1) which are positioned on either side of the bottle transport path level with the tapering portion 1b of the bottles 1, and at a spacing E that is adjustable. By adjusting the spacing E between the longitudinal guides 7, the maximum forward or backward tilt angle B of the bottles 1 in the transport direction is advantageously adjusted. Preferably, the two longitudinal guides 7 are adjusted in position in such a manner that the angle B is kept less than or equal to 30°, thereby making it possible to limit effectively the risk of a bottle 1 jamming by forward or backward tilting during transport. In addition, the two guides 7 are preferably adjusted in position in such a manner that said angle B is greater that or equal to 10°. It has been shown that when the value of the tilt angle B is less than 10°, the bottles tend to impede proper operation of the conveyor by being transported while swinging jerkily and too quickly about their equilibrium position.

When a bottle 1 tilts forwards or backwards in the transport direction through an angle B, a portion of its top end 1d rises because of the tilting, as can be seen clearly in FIG. 2. To avoid disturbing travel of the bottles 1, it is therefore essential, in the event of a bottle 1 tilting through an angle B, to ensure that the end 1d does not come into contact with the bottom face 6a of the stop 6, which is represented in FIG. 2 by residual clearance Jr'. Given that the up stroke of the end 1d of the bottle 1 is at a maximum when the forward or backward tilt angle B of the bottle 1 is equal to 45°, it is preferable for the thickness of the stop to be selected in such a manner as to leave residual clearance Jr' in the event of the bottle tilting through an angle B that is equal to 45°.

Figure 3:
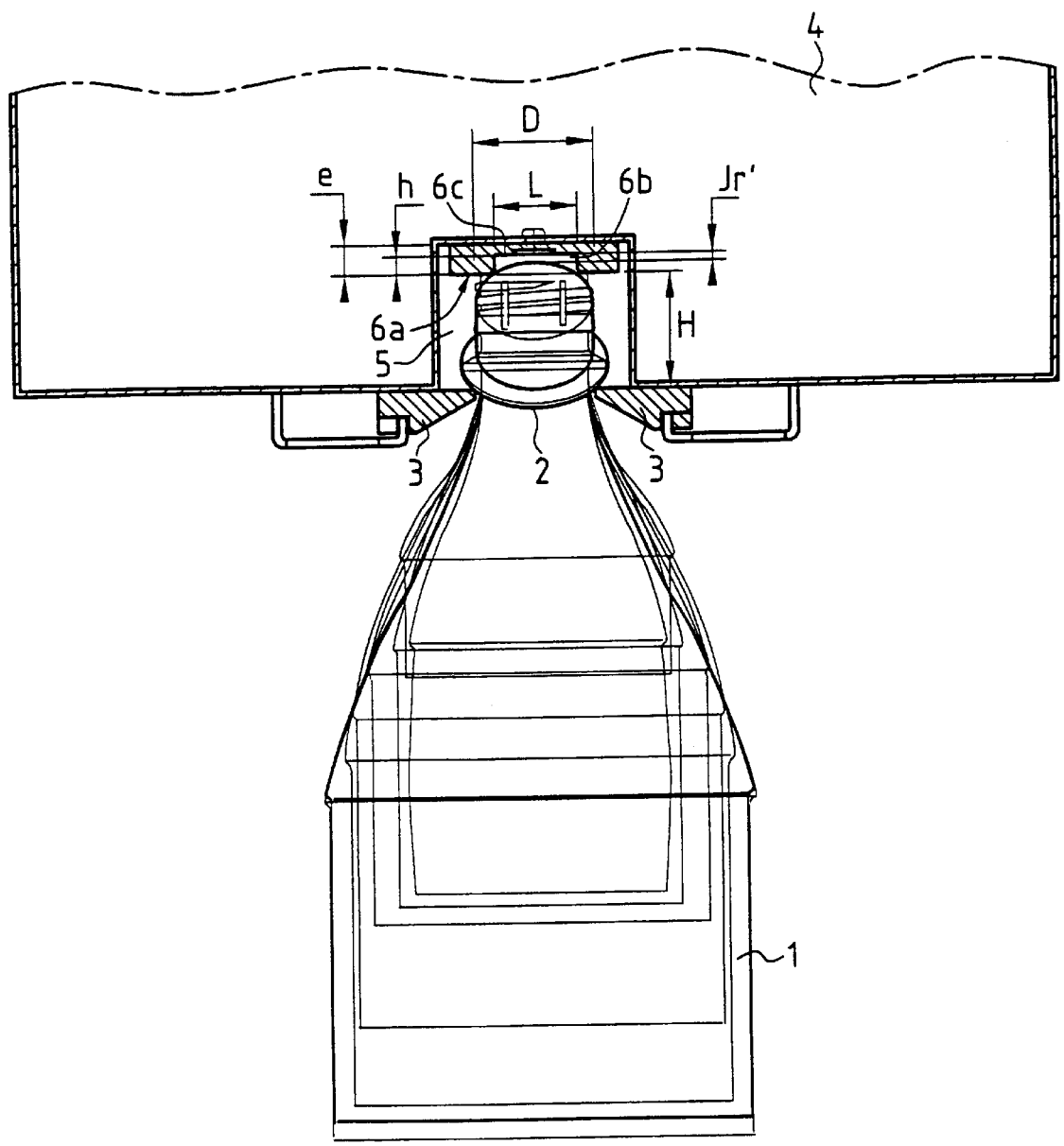
FIG. 3 is a diagrammatic cross-section of a first improved embodiment of an air conveyor of the invention implementing a stop having a central recess that forms a longitudinal channel.

In the variant of FIG. 3, the stop 6 is improved insofar as it has a longitudinal central recess 6b in its bottom face 6a, thereby forming a longitudinal central channel. In a manner that is essential for the invention, the width L of the recess 6b is less than the diameter D of the top end 1d of the bottle. This characteristic enables the bottom face 6a of the stop 6 to perform its top abutment function in the event of a bottle 1 rising in the vertical position from the guide rails 3, in particular during a bottle accumulation stage. The recessed central portion 6b of the stop 6 advantageously enables the bottle 1 to tilt forwards or backwards through an angle B such that a portion of the end 1d of the bottle rises into the channel formed by the recess 6b without coming into contact with the stop 6. Given the structure of the stop 6 shown in FIG. 3, it is thus advantageously possible firstly to select a thickness e for the stop suitable for obtaining residual clearance Jr that is small while the bottle 1 is in the vertical position, and secondly to adapt the shape of the recess 6b (i.e. mainly the width L of the recess 6b and its height h) in such a manner that there exists residual clearance Jr' (FIG. 3) between the far wall 6c of the recess 6b and the top end 1d of a bottle 1 supported by the under-neck guides 3 at some given forward or backward tilt angle B. Preferably, the shape of the recess 6b is selected so that there exists residual clearance Jr' when the bottle 1 is inclined at a forward or backward tilt angle B equal to 45°.

In the context of this FIG. 3 variant, it is possible to envisage not using a fitted stop but instead designing a conveyor ab initio so that its blow channel 5 has a top wall 5a in which a longitudinal channel is provided that is equivalent to and that performs the same function as the central recess 6b of the stop 6. Under such circumstances, the height of the blow channel is designed to be small enough to ensure that the bottom face of the wall 5a on either side of the central channel in said wall performs the top abutment function. In another variant, it is also possible to envisage implementing a fitted stop 6 which is not a solid stop having a recess formed in the center thereof, but which is constituted, for example, by sheet metal shaped so as to have a concave channel performing the same function as the central recess 6b. Finally, it is also possible to envisage fitting a stop that is made up of two separate longitudinal elements, fixed to the inside face of the top wall 5a of the blow channel 5, and spaced apart from each other by a channel of width L performing the same function as the central recess 6b in the stop 6 of FIG. 3.

Using a fitted stop 6 of suitably determined thickness e makes it possible, advantageously, to adapt existing conveyors in a simple manner to a given type of bottle by appropriately selecting the thickness for the stop, thereby reducing the risk of bottles jamming in the event of a bottle being lifted relative to the guide rails 3 of the conveyor. In the particular examples shown, the shape of the central recess 6b of the stop 6 constitutes a downwardly-open channel section with the flanges thereof being substantially orthogonal to the far wall 6c or "web" of the recess. Nevertheless, the invention is not limited to this particular shape. The central recess 6b could have a curved shape, for example in the form of a circular arc, with a radius of curvature that matches the radius of curvature of the top ends 1d of the bottles 1. Similarly, the stop 6 in the variant of FIG. 1 presents in this example a right section that is rectangular in shape. Naturally, the invention is not restricted to this particular shape for the stop 6, and the right section of the stop 6 can be arbitrary, given that all that is required is contact along a conveyor line between the bottle and the stop. For example, the stop 6 in the variant of FIG. 1 could be cylindrical in right section, or it could be semi-cylindrical.

Figure 4:
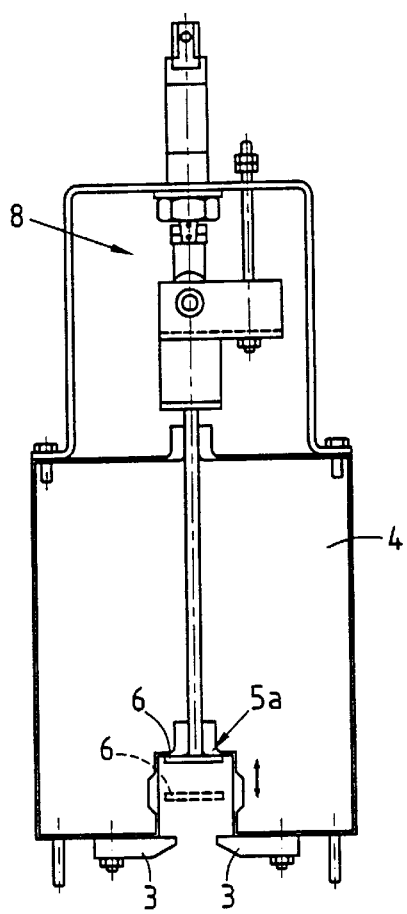
FIG. 4 is a diagram of a second improved variant embodiment of an air conveyor of the invention, implementing a top abutment of adjustable height.

FIG. 4 shows another improved embodiment of the invention, in which the conveyor 4 is fitted with a longitudinal stop 6 of small thickness and whose vertical position is adjustable. In the example shown, the stop 6 can be adjusted vertically by means of a two-position pneumatic jack 8 to take up two positions: a high position and a low position. In the high position, as shown by solid lines in FIG. 4, the stop 6 comes into contact, for example, with the top wall 5a of the blow channel 5. In this position, the residual clearance that exists between the bottles 1 and the stop 6 is at a maximum. The bottles 1 can be transported freely without their top ends 1d coming into contact with the stop 6. In the low position (as shown by dashed lines in FIG. 2), the residual clearance between the bottles and the stop 6 is adjusted to a minimum value. In practice, the air conveyor is subdivided into a plurality of successive segments, each segment having its own stop 6 whose height can be adjusted independently from the stops 6 in the other segments. The conveyor segments in which the bottles are moving should be configured in such a manner that their stops 6 are put in the high position. In contrast, in conveyor segments corresponding to zones in which bottles 1 are accumulating, it is advantageous to adjust the stops 6 of such segments so that they occupy the low position so as to reduce the risks of bottles jamming while they are accumulating. The jacks 8 associated with each stop 6 can be controlled automatically on the basis of detection signals issued by contactless sensors of the photocell type or of the ultrasound type, positioned respectively in register with each segment, and serving automatically to detect when bottles accumulate in any given segment.

When the variant of FIG. 4 is compared with that of FIG. 3, the low position of the stop 6 in FIG. 4 corresponds to the level of the bottom face 6a of the stop 6 in FIG. 3, while its high position corresponds to the level of the far wall 6c of the longitudinal central recess 6b in the stop 6 of FIG. 3.

In another variant embodiment, the FIG. 4 variant can be modified in such a manner that the stop 6 can take up several positions. In particular, in an improved variant, it is possible, e.g. by using a three-position pneumatic jack 8, to provide an additional position for the stop 6 that is situated lower than the low position of FIG. 4 and that corresponds to an "unjamming" position. This unjamming position is determined as a function of the shape of the bottles 1 so that when the stop 6 is in this position it comes close enough to the under-neck guides 3 to unjam a bottle 1 that has become accidentally jammed, e.g. in a position where it slopes forwards or backwards.

Figure 5:
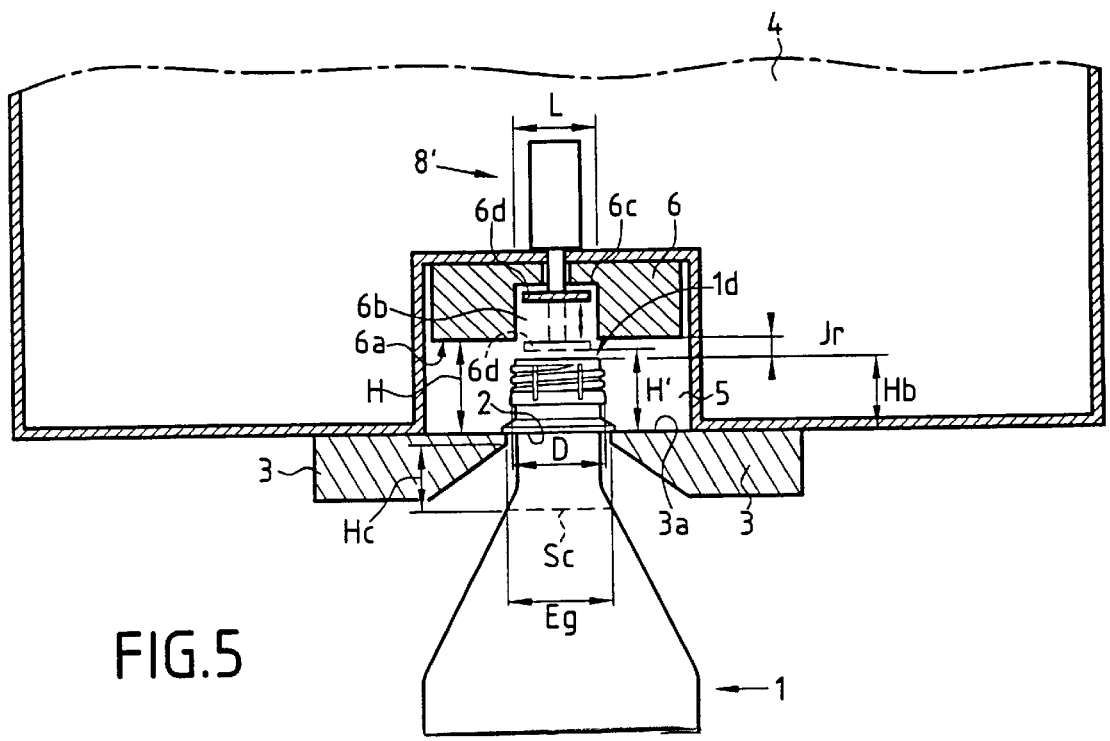
FIG. 5 is a diagrammatic section of a third improved embodiment of an air conveyor of the invention, implementing a hollowed-out stop with a moving plate of adjustable height.

In the variant of FIG. 5, there can be seen the stop 6 with the central recess as in the variant of FIG. 3. However, in this FIG. 5 variant, the top abutment also comprises a longitudinal plate 6d which is received in the longitudinal recess 6b of the stop 6, and which can be moved in translation in a vertical plane so as to be adjustable in height. More particularly, the vertical position of this plate 6d can be adjusted by means of a two-position actuator 8' between a low position and a high position (shown in solid lines) in which the plate 6d is close to the far wall 6c of the longitudinal recess 6b. This high position corresponds to the high position of the stop 6 in the variant of FIG. 4. The low position (shown in dashed lines) corresponds to a position for unjamming the bottles 1. This unjamming position of the plate 6d is situated at an intermediate level between a bottom face 6a of the stop 6 and a top end 1d of a bottle 1 supported in a vertical position by the under-neck guides 3. In other words, with reference to FIG. 5, when the plate 6d is in the unjamming position, it is at a distance H' from the top face 3a of the under-neck guides 3 lying in the range between the height H and the height Hb corresponding to the height of the top portion of the bottle 1 (its rim) which extends between the top end 1d of the bottle 1 and the collar 2 (collar included). The height H' is preferably slightly greater than the height Hb. It should be emphasized at this point that the height H' corresponding to the unjamming position of the plate 6d should preferably be greater than the height Hb of the bottles 1 so as to avoid clamping contact during operations of unjamming the bottles 1 between the plate 6d and the under-neck guides 3.

What is claimed is:
1. A conveyor for articles each provided with an outwardly-projecting collar, said conveyor comprising:
two spaced-apart under-neck guides along which the articles are to be transported by being suspended on the under-neck guides via their collars, wherein each article includes a tapering portion beneath the collar, with a section of the tapering portion decreasing towards the collar and passing through a contact section of diameter equal to a spacing between the under-neck guides; and a longitudinal stop mounted above the under-neck guides and serving to limit an up stroke available to articles between the under-neck guides, wherein the stop is provided at a distance from the under-neck guides such that a first residual clearance exists between the stop and a top end of an article when supported in a vertical position by the under-neck guides, which first residual clearance is less than a contact height between the under-neck guides and the contact section of the article when in the vertical position.

2. The conveyor according to claim 1, wherein the stop has a longitudinal bottom face that serves as an abutment and in which there is provided a longitudinal central channel.

3. The conveyor according to claim 2 wherein the shape of the central channel of the stop is designed in such a manner as to ensure that a second residual clearance exists between the stop and a top end of an article supported by the under-neck guides when the article is at a forward or backward tilt angle of 45°.

4. The conveyor according to claim 1, wherein the vertical position of the stop is not adjustable, and a thickness of the stop is selected as a function of the articles to be transported.

5. The conveyor according to claim 1, wherein the vertical position of the stop relative to the under-neck guides is adjustable.

6. The conveyor according to claim 5, wherein the stop is designed to be adjustable to occupy at least two positions:

a high position in which the articles can be transported freely without their top ends coming into contact with the stop; and a low position for limiting the up stroke available to articles between the under-neck guides, in particular while articles are accumulating.

7. The conveyor according to claim 6, for articles including a tapering portion beneath the collar, a section of the tapering portion decreasing towards the collar, and passing through a contact section of diameter equal to a spacing between the under-neck guides, wherein the low position is designed in such a manner that there exists a first residual clearance in the low position between the stop and a top end of an article supported in the vertical position by the under-neck guides, which first residual clearance is less than a contact height between the under-neck guides and the contact section of said article when in the vertical position.

8. The conveyor according to claim 6, wherein the high position is designed in such a manner that a second residual clearance exists between the stop and a top end of an article supported by the under-neck guides when the article is at a forward or backward tilt angle of 45°.

9. The conveyor according to claim 5, wherein the vertical position of the stop relative to the under-neck guides is designed to be adjustable so as to occupy an unjamming position that is close enough to the under-neck guides to enable an article that has become jammed accidentally to be unjammed mechanically.

10. The conveyor according to claim 2, wherein the longitudinal central channel of the stop has a width which is less than a diameter of a top end of an article.

11. The conveyor according to claim 10, further comprising a longitudinal plate mounted in register with the central channel and having a vertical position that is adjustable.

12. The conveyor according to claim 11, wherein the plate is designed to be adjusted vertically to occupy at least two positions:

a high position in which the plate is received in the central channel of the stop; and a low position for unjamming articles, in which position the plate is situated beneath a level of the bottom face of the stop that serves as an abutment.

13. The conveyor according to claim 1, further comprising two top longitudinal guides which are positioned on either side of the path of the articles and which serve to limit the forward or backward tilt angles of the articles in a vertical plane and in their transport direction.

14. The conveyor according to claim 13, wherein the two top guides are adjustable in position in such a manner that the forward and backward tilt angles of an article being transported are ranging between 30° and 10°.

15. The conveyor according to claim 1, comprising a conveyor channel mounted above the under-neck guides and having a top wall, and wherein the longitudinal stop is fixed to an inside face of said top wall.

16. A conveyor for articles, each article being provided with an outwardly-projecting collar, said conveyor comprising:

two spaced-apart under-neck guides along which the articles are to be transported by being suspended on the under-neck guides via their collars;

a conveyor channel mounted above the under-neck guides and having a top wall; and a longitudinal stop which is fixed to an inside face of said top wall, the longitudinal stop serving to limit the up stroke available to articles between the under-neck guides, wherein the longitudinal stop extends substantially continuously along the length of said top wall.

17. The conveyor according to claim 16, for articles including a tapering portion beneath the collar, with a section of the tapering portion decreasing towards the collar and passing through a contact section of diameter equal to a spacing between the under-neck guides, wherein the stop is provided at a distance from the under-neck guides such that a first residual clearance exists between the stop and a top end of an article when supported in the vertical position by the under-neck guides, which first residual clearance is less than a contact height between the under-neck guides and the contact section of the article when in the vertical position.

18. The conveyor according to claim 16, wherein the stop has a longitudinal bottom face that serves as an abutment and in which there is provided a longitudinal central channel.

19. The conveyor according to claim 18, wherein the longitudinal central channel of the stop has a width which is less than a diameter of a top end of an article.

20. The conveyor according to claim 19, wherein the shape of the central channel of the stop is designed in such a manner as to ensure that a second residual clearance exists between the stop and a top end of an article supported by the under-neck guides when the article is at a forward or backward tilt angle of 45°.

21. The conveyor according to claim 18, wherein the shape of the central channel of the stop is designed in such a manner as to ensure that a second residual clearance exists between the stop and a top end of an article supported by the under-neck guides when the article is at a forward or backward tilt angle of 45°.

22. The conveyor according to claim 16, wherein the vertical position of the stop is not adjustable, and the thickness of the stop is selected as a function of the articles to be transported.

23. The conveyor according to claim 18, further comprising a longitudinal plate mounted in register with the central channel of the stop and having a vertical position that is adjustable.

24. The conveyor according to claim 23, wherein the plate is designed to be adjusted vertically to occupy at least two positions:
- a high position in which the plate is received in the central channel of the stop; and
- a low position for unjamming articles, in which position the plate is situated beneath a level of the bottom face of the stop that serves as an abutment.

25. The conveyor according to claim 16, further comprising two top longitudinal guides which are positioned on either side of the path of the articles and which serve to limit the forward or backward tilt angles of the articles in a vertical plane and in their transport direction.

26. The conveyor according to claim 25, wherein the two top guides are adjustable in position in such a manner that the forward and backward tilt angles of an article being transported are ranging between 30° and 10°.

27. A conveyor for articles each provided with an outwardly-projecting collar, said conveyor having two spaced-apart under-neck guides along which the articles are to be transported by being suspended on the under-neck guides via their collars, the conveyor including a longitudinal stop mounted above the under-neck guides and serving to limit an up stroke available to articles between the under-neck guides, wherein the stop has a longitudinal bottom face that serves as an abutment and in which there is provided a longitudinal central channel.

28. A conveyor for articles each provided with an outwardly-projecting collar, said conveyor having two spaced-apart under-neck guides along which the articles are to be transported by being suspended on the under-neck guides via their collars, the conveyor including a longitudinal stop mounted above the under-neck guides and serving to limit an up stroke available to articles between the under-neck guides, wherein a vertical position of the stop relative to the under-neck guides is adjustable.

* * * * *